United States Patent
Hu et al.

(10) Patent No.: US 12,287,526 B2
(45) Date of Patent: Apr. 29, 2025

(54) OPTICAL ELEMENT DRIVING MECHANISM

(71) Applicant: TDK TAIWAN CORP., Taoyuan (TW)

(72) Inventors: Chao-Chang Hu, Taoyuan (TW); Chen-Hsien Fan, Taoyuan (TW); Yueh-Lin Lee, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 588 days.

(21) Appl. No.: 17/587,032

(22) Filed: Jan. 28, 2022

(65) Prior Publication Data

US 2022/0244483 A1  Aug. 4, 2022

Related U.S. Application Data (60) Provisional application No. 63/143,344, filed on Jan. 29, 2021.

(51) Int. Cl.
| | |
|---|---|
| G02B 7/02 | (2021.01) |
| G02B 7/09 | (2021.01) |
| G02B 27/64 | (2006.01) |
| H04N 23/54 | (2023.01) |
| H04N 23/55 | (2023.01) |

(52) U.S. Cl.
CPC .............. *G02B 7/028* (2013.01); *G02B 7/021* (2013.01); *G02B 7/023* (2013.01); *G02B 7/09* (2013.01); *G02B 27/646* (2013.01); *H04N 23/54* (2023.01); *H04N 23/55* (2023.01)

(58) Field of Classification Search
CPC ........ H04N 23/55; H04N 23/54; G02B 27/64; G02B 27/646; G02B 7/09; G02B 7/026; G02B 7/021; G02B 7/023; G02B 7/022; G02B 7/02; G02B 7/028
See application file for complete search history.

(56) References Cited

U.S. PATENT DOCUMENTS

| | | | |
|---|---|---|---|
| 2018/0164538 A1* | 6/2018 | Lee | G03B 9/06 |
| 2020/0033552 A1* | 1/2020 | Wu | G03B 3/10 |
| 2020/0033558 A1* | 1/2020 | Huang | H04N 23/54 |

* cited by examiner

*Primary Examiner* — Christopher Stanford
*Assistant Examiner* — Journey F Sumlar
(74) *Attorney, Agent, or Firm* — Muncy, Geissler, Olds & Lowe, P.C.

(57) ABSTRACT

An optical element driving mechanism is provided in the present disclosure, including a first movable portion, a fixed portion, a first driving assembly and a first supporting assembly. The first movable portion is connected to a first optical element. The first movable portion is movable relative to the fixed portion. The first driving assembly drives the first movable portion to move relative to the fixed portion in a first dimension. The first supporting assembly is disposed between the first movable portion and the fixed portion. The first movable portion moves relative to the fixed portion via the first supporting assembly.

18 Claims, 6 Drawing Sheets

OPTICAL ELEMENT DRIVING MECHANISM

CROSS REFERENCE TO RELATED APPLICATIONS

This application claims the benefit of U.S. Provisional Application No. 63/143,344, filed Jan. 29, 2021, the entirety of which is incorporated by reference herein.

BACKGROUND OF THE INVENTION

Field of the Invention

The present disclosure is related to an optical element driving mechanism, and more particularly to an optical element driving mechanism with a movable optical sensing element.

Description of the Related Art

As technology has developed, it has become more common to include image-capturing and video-recording functions into many types of modern electronic devices, such as notebook computers, smartphones, and digital cameras. These electronic devices are used more and more often. In addition to the models that have been developed to be more convenient, thin, and lightweight, it is also desirable to provide optical qualities that are better and more stable, offering consumers more choice.

Electronic devices that have image-capturing or video-recording functions normally include one or more lenses, thereby being able to perform such functions as auto focus (AF), zooming, and optical image stabilization (OIS). Therefore, an optical element driving mechanism usually includes a plurality of optical elements, including the lens itself and optical sensing elements for sensing optical effects. However, to achieve the desired optical effects by simply moving the lenses tends to complicate the mechanism. As a result, it is important to design an optical element driving mechanism with an optical sensing element that is movable relative to the entire mechanism, which can achieve optical effects and improve overall stability.

BRIEF SUMMARY OF THE INVENTION

An optical element driving mechanism is provided in the present disclosure, including a first movable portion, a fixed portion, a first driving assembly and a first supporting assembly. The first movable portion is connected to a first optical element. The first movable portion is movable relative to the fixed portion. The first driving assembly drives the first movable portion to move relative to the fixed portion in a first dimension. The first supporting assembly is disposed between the first movable portion and the fixed portion. The first movable portion moves relative to the fixed portion via the first supporting assembly.

In some embodiments, the optical element driving mechanism further includes a second movable portion, a second driving assembly, a third movable portion, and a third driving assembly. The second movable portion includes a first holder. The first holder is connected to the first optical element. The second driving assembly drives the second movable portion to move relative to the fixed portion in a second dimension. The third movable portion includes a second holder. The second holder is connected to a second optical element. The third driving assembly drives the third movable portion to move relative to the fixed portion in a third dimension. In some embodiments, the second movable portion is movable relative to the first movable portion, and the third movable portion is movable relative to the second movable portion. In some embodiments, the first optical element includes a lens, and the second optical element includes an optical sensing element. In some embodiments, the third dimension is different from the first dimension and the second dimension. In some embodiments, the optical element driving mechanism further includes a main axis. The first optical element has a first optical axis, and the second optical element has a second optical axis. A movement in the first dimension is a translational movement along the main axis. A movement in the second dimension is a translational movement along the first optical axis. A movement in the third dimension is a translational movement in a direction that is perpendicular to the second optical axis or a rotational movement around a first rotational axis. The first rotational axis is parallel to the second optical axis.

In some embodiments, the first driving assembly includes a driving element and a transmitting element. The driving element includes piezoelectric material, generating a first driving force. The transmitting element is connected to the driving element, transmitting the first driving force to the first movable portion. The transmitting element is movable relative to the fixed portion and the first movable portion. The second driving assembly includes a first coil and a first magnetic element. The first magnetic element corresponds to the first coil, generating a second driving force. The third driving assembly includes a second coil, a second magnetic element, a third coil, and a third magnetic element. The second magnetic element corresponds to the second coil, generating a third driving force. The third magnetic element corresponds to the third coil, generating a fourth driving force.

In some embodiments, the direction of the first driving force is parallel to the main axis. The direction of the second driving force is parallel to the first optical axis. The direction of the third driving force is perpendicular to the second optical axis. The direction of the fourth driving force is perpendicular to the second optical axis. In some embodiments, when viewed along the second optical axis, the direction of the third driving force passes through the center of the second optical axis. When viewed along a direction perpendicular to the second optical axis, the direction of the third driving force does not pass through the center of the second optical axis.

In some embodiments, when viewed along the second optical axis, the second magnetic element has a bar-shaped structure extending along a first axis, and the third magnetic element has a bar-shaped structure extending along a second axis, wherein the first axis is not parallel to the second axis. In some embodiments, the first axis is perpendicular to the second axis. When viewed along the second optical axis, the third magnetic element has an arc structure. In some embodiments, when viewed along the second optical axis, the largest size of the second magnetic element along the first axis is different from the largest size of the third magnetic element along the second axis. The largest size of the second coil along the first axis is different from the largest size of the third coil along the second axis.

In some embodiments, when viewed along the main axis, the fixed portion has a polygonal structure. The fixed portion includes a first side and a second side. The first side extends along a third axis. The second side extends along a fourth axis. The largest size of the first side on the third axis is different from the largest size of the second side on the fourth axis. In some embodiments, when viewed along the main axis, the first driving assembly is located on the second side. When viewed along the third axis, the first driving assembly partially overlaps the second driving assembly. When viewed along the fourth axis, the first driving assembly does not overlap the second driving assembly. When viewed along the third axis, the first driving assembly partially overlaps the second magnetic element. When viewed along the third axis, the first driving assembly partially overlaps the third magnetic element. When viewed along the fourth axis, the first driving assembly does not overlap the third driving assembly.

In some embodiments, when viewed along the main axis, a line connecting the first supporting assembly and the first driving assembly passes through the first optical element. When viewed along the third axis, the first supporting assembly partially overlaps the first driving assembly; the first supporting assembly partially overlaps the second driving assembly; the first supporting assembly partially overlaps the third driving assembly; the first supporting assembly partially overlaps the first optical element; and the first supporting assembly partially overlaps the second optical element. When viewed along the fourth axis, the first supporting assembly does not overlap the first driving assembly; the first supporting assembly does not overlap the second driving assembly; the first supporting assembly does not overlap the third driving assembly; the first supporting assembly does not overlap the first optical element; and the first supporting assembly does not overlap the second optical element.

In some embodiments, the optical element driving mechanism further includes a second supporting assembly and a third supporting assembly. The second supporting assembly is disposed between the first movable portion and the second movable portion. The second movable portion moves relative to the fixed portion via the second supporting assembly. The third supporting assembly is disposed between the first movable portion and the third movable portion. The third movable portion moves relative to the fixed portion via the third supporting assembly. The distance between the second supporting assembly and a first side of the fixed portion is smaller than the distance between the second supporting assembly and a second side of the fixed portion.

In some embodiments, the first supporting assembly includes a first supporting element, fixedly disposed at the fixed portion, having a bar-shaped structure. The first movable portion moves relative to the first supporting element. The second supporting assembly includes a second supporting element having flexibility and a plate structure. The second movable portion is movably connected to the first movable portion via the second supporting element. The third supporting assembly includes a third supporting element having flexibility and a bar-shaped structure. The third movable portion is movably connected to the first movable portion via the third supporting element.

In some embodiments, the fixed portion further includes a case, a base, and a third optical element. The case includes a top wall with a plate shape. The base is fixedly connected to the case, forming an accommodating space for the first movable portion. The third optical element is affixed to the top wall. A light passes through the third optical element before entering the second optical element. Before the light enters the second optical element, the light passes through the first optical element. The first driving assembly drives the first optical element to move relative to the third optical element.

In some embodiments, the optical element driving mechanism further includes a first stopper assembly, a second stopper assembly, and a third stopper assembly. The first stopper assembly defines a first range of movement within which the first movable portion is movable relative to the fixed portion. The second stopper assembly defines a second range of movement within which the second movable portion is movable relative to the first movable portion. The third stopper assembly defines a third range of movement within which the third movable portion is movable relative to the second movable portion. The first range of movement is wider than the second range of movement.

In some embodiments, the first stopper assembly is located at the first movable portion and the fixed portion. The second stopper assembly is located at the first movable portion and the third movable portion. The third stopper assembly is located at the first movable portion and the third movable portion. In some embodiments, the first movable portion includes a frame surrounding its circumference. The third movable portion includes a circuit assembly electrically connected to the third driving assembly. The second stopper assembly is located at the frame and the circuit assembly.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion. The various embodiments are described with reference to the attached figures, where like reference numerals are used throughout the figures to designate similar or equivalent elements.

DETAILED DESCRIPTION OF THE INVENTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the device including the features.

An optical element driving mechanism is provided in the present disclosure, including a plurality of optical elements, such as lenses and optical sensing elements, etc. To achieve desirable optical effects, these optical elements may be movable relative to each other. Therefore, the optical element driving mechanism of the present disclosure further includes a plurality of driving assemblies for moving one or more optical elements, respectively. In the present disclosure, these driving assemblies allow the optical elements to move in different directions, such as translational movements on X, Y, Z axes and/or rotational movements around Z axis, thereby achieving great optical effects.

Figure 1:
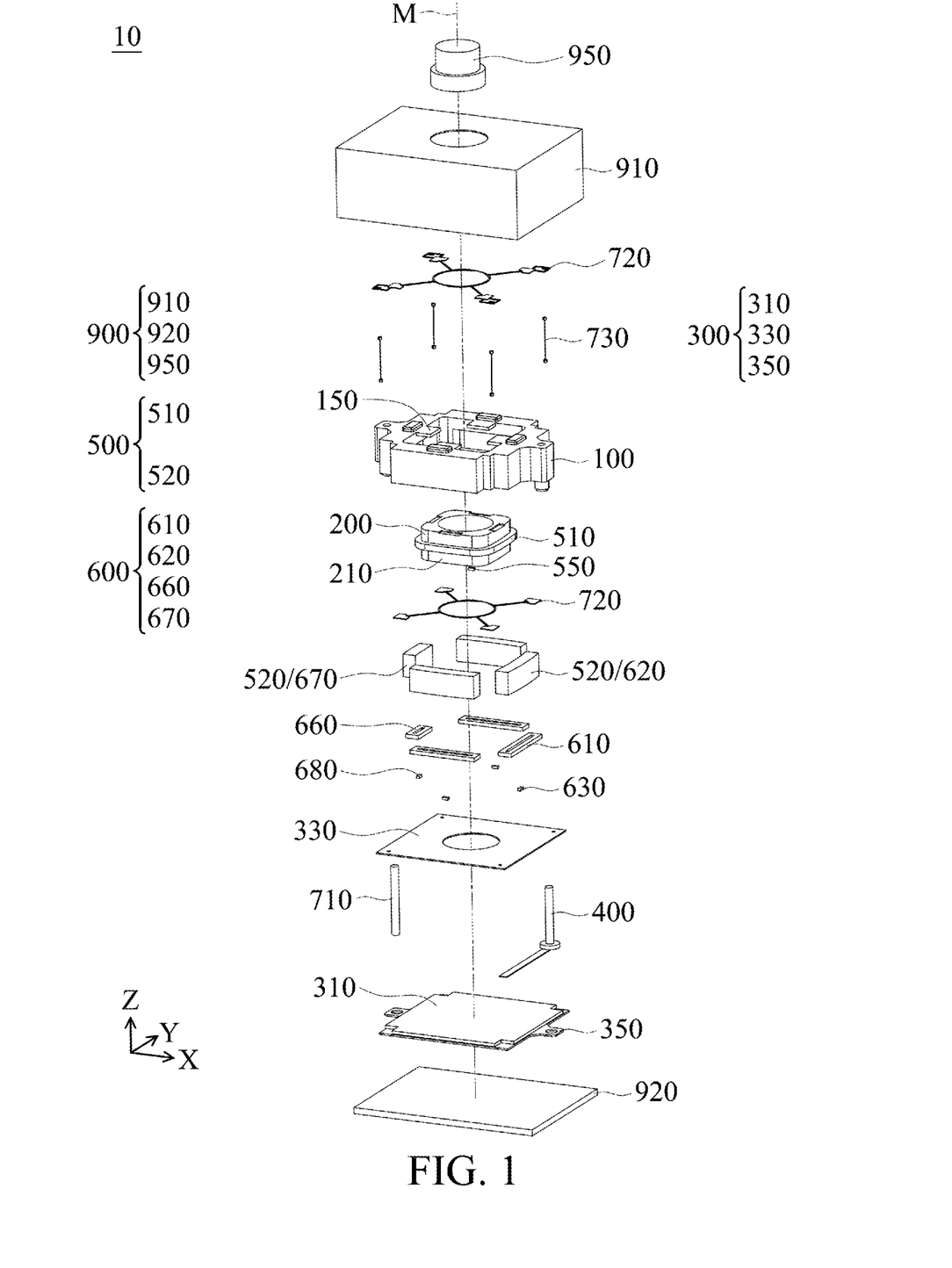
FIG. 1 is an exploded view of the optical element driving mechanism, according to some embodiments of the present disclosure.

Referring to FIG. 1, FIG. 1 is an exploded view of the optical element driving mechanism 10, according to some embodiments of the present disclosure. As shown in FIG. 1, the optical element driving mechanism 10 mainly includes: a first movable portion 100, a second movable portion 200, a third movable portion 300, a first driving assembly 400, a second driving assembly 500, a third driving assembly 600, and a fixed portion 900. In some embodiments, the first movable portion 100 may be connected to a first optical element (e.g. a lens group including one or more lenses, not shown), and the second movable portion 200 may also be connected to the first optical element. The third movable portion 300 may be connected to a second optical element (e.g. an optical sensing element, not shown). Each of the components of the optical element driving mechanism 10 are arranged along the main axis M. The first optical element has a first optical axis O1, and the second optical element has a second optical axis O2 (see FIG. 4). In some embodiments, the main axis M, the first optical axis O1, and the second optical axis O2 are parallel to one another. According to some embodiments of the present disclosure, the first driving assembly 400 drives the first movable portion 100 to move relative to the fixed portion 900 in a first dimension. The second driving assembly 500 drives the second movable portion 200 to move relative to the fixed portion 900 in a second dimension. The third driving assembly 600 drives the third movable portion 300 to move relative to the fixed portion 900 in a third dimension. More specifically, the second movable portion 200 is movable relative to the first movable portion 100, and the third movable portion 300 is movable relative to the first movable portion 100 and the second movable portion 200. In some embodiments, the third dimension is different from the first dimension, and also different from the second dimension. For example, in some embodiments, a movement in the first dimension is a translational movement along the main axis M. A movement in the second dimension is a translational movement along the first optical axis O1. A movement in the third dimension is a translational movement in a direction that is perpendicular to the second optical axis O2 or a rotational movement around a first rotational axis, wherein the first rotational axis is parallel to the second optical axis O2.

Figure 2:
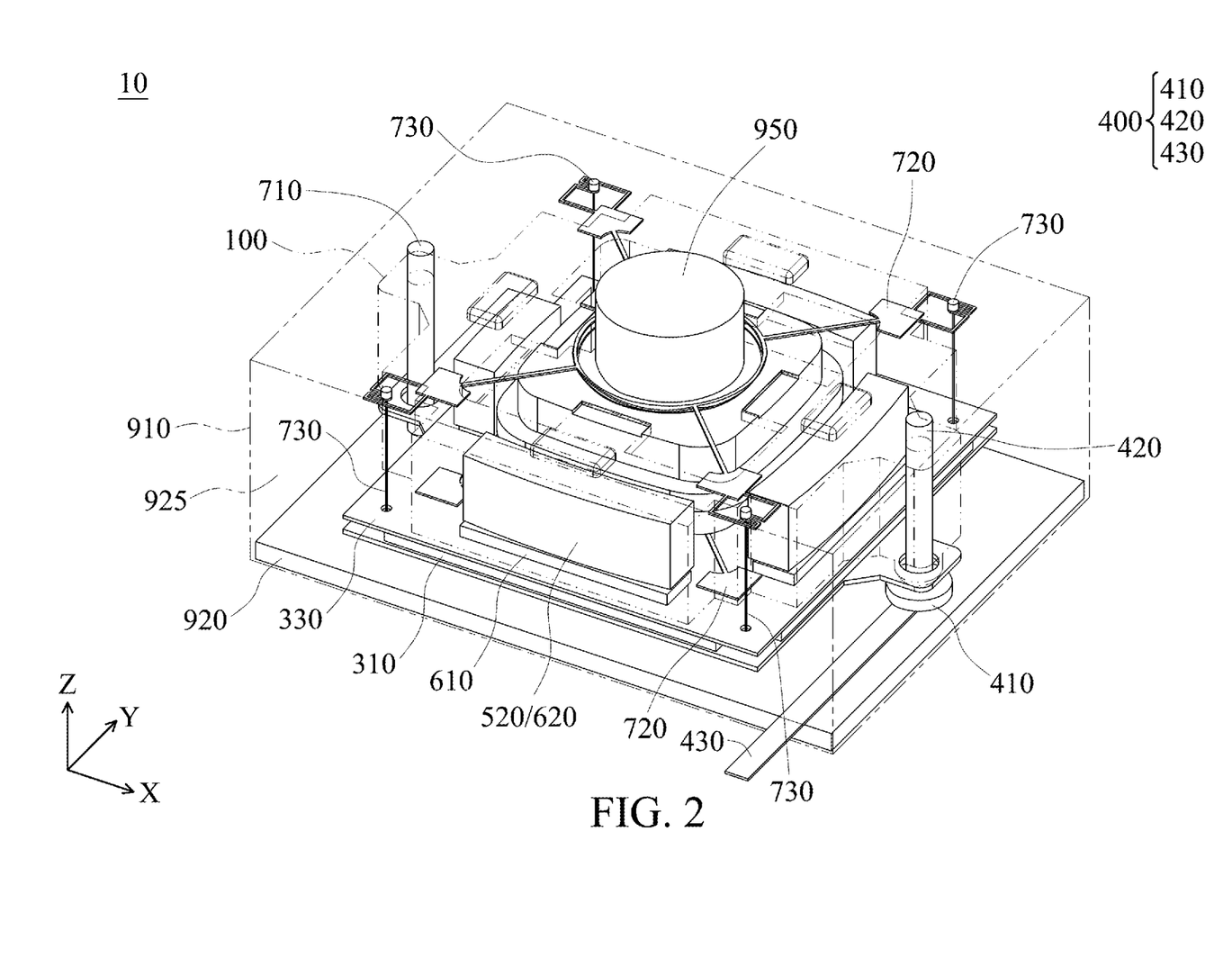
FIG. 2 is a perspective view of the optical element driving mechanism, according to some embodiments of the present disclosure.

Referring to FIG. 1 and FIG. 2, FIG. 2 is a perspective view of the optical element driving mechanism 10, according to some embodiments of the present disclosure. The optical element driving mechanism 10 of the present disclosure further includes a first supporting assembly 710, a second supporting assembly 720, and a third supporting assembly 730. The first supporting assembly 710 is disposed between the first movable portion 100 and the fixed portion 900. The first movable portion 100 moves relative to the fixed portion 900 via the first supporting assembly 710. The second supporting assembly 720 is disposed between the first movable portion 100 and the second movable portion 200. The second movable portion 200 moves relative to the fixed portion 900 via the second supporting assembly 720. The third supporting assembly 730 is disposed between the first movable portion 100 and the third movable portion 300. The third movable portion 300 moves relative to the fixed portion 900 via the third supporting assembly 730.

Specifically, the first supporting assembly 710 includes a first supporting element with a bar-shaped structure that is fixedly disposed at the fixed portion 900 and extends along the main axis, as shown in FIG. 2. The first movable portion 100 has a through hole that corresponds to the first supporting element, allowing the first supporting element to go through the through hole, so that the first movable portion 100 is movable relative to the first supporting element. The second supporting assembly 720 includes one or more second elements that have flexibility and plate structures and are perpendicular to the first optical axis O1. In the embodiment shown in FIG. 2, the second supporting assembly 720 includes two supporting elements, disposed above and under the second moveable portion 200, respectively. In some embodiments, the second supporting elements may be spring sheets or other suitable flexible material, and may be in any suitable shapes. The second movable portion 200 is movably connected to the first movable portion 100 via the second supporting elements. the third supporting assembly 730 includes one or more third supporting elements that have flexibility and bar-shaped structures. In the embodiments shown in FIG. 2, the third supporting assembly 730 includes four of the third supporting elements, disposed at the four corners of the first movable portion 100, respectively, and extending along the second optical axis O2. In some embodiments, the third supporting elements may be suspension wires. The third movable portion 300 is movably connected to the first movable portion 100 via the third supporting element. In some other embodiments, the third supporting elements may have ball-shaped structures. By disposing multiple balls between the first movable portion 100 and the third movable portion 300, the third movable portion 300 is movable relative to the first movable portion 100. It should be noted that neither the second supporting assembly 720 nor the third supporting assembly 730 is in contact with the fixed portion 900. Additionally, if the side of the fixed portion 900 without the first supporting assembly 710 is referred to as the first side 901 (see FIG. 5), and the side of the fixed portion 900 with the first supporting assembly 710 is referred to as the second side 902 (see FIG. 5), as shown in FIG. 2, the distance between the second supporting assembly 720 and the first side 901 of the fixed portion 900 is smaller than the distance between the second supporting assembly 720 and the second side 902 of the fixed portion 900.

As shown in FIG. 2, on the side opposite from the first supporting assembly 710, the first driving assembly 400 is disposed. The first driving assembly 400 includes a driving element 410, a transmitting element 420, and a conducting element 430. The driving element 410 is affixed to the fixed portion 900, having piezoelectric material and generating the first driving force F1 (see FIG. 4). The direction of the first driving force F1 is parallel to the main axis M. The transmitting element 420 has a bar-shaped structure and extends along the main axis M. One of the ends of the transmitting element 420 is connected to the driving element 410, transmitting the first driving force F1 to the first movable portion 100. The transmitting element 420 is movable relative to the fixed portion 900 and the first movable portion 100, achieving effects of optical zooming or optical focusing. More specifically, the first movable portion 100 has a through hole that corresponds to the transmitting element 420, allowing the transmitting element 420 to go through the through hole, so that the first movable portion 100 is movable relative to the transmitting element 420. When the transmitting element 420 is pushed by the first driving force F1 generated by the driving element 410 and moves along the main axis M, if the friction force between the transmitting element 420 and the first movable portion 100 is smaller than the maximum static friction therebetween, the transmitting element 420 may carry the first movable portion 100 to move together along the main axis M. Thus, the first movable portion 100 may be driven to move relative to the fixed portion 900. It should be noted that, in some embodiments, the first driving assembly 400 drives the first movable portion 100 to move while carrying the second movable portion 200 to move relative to the fixed portion 900. In some embodiments, the first driving assembly 400 drives the first movable portion 100 to move while also carrying the third movable portion 300 to move relative to the fixed portion 900. The conducting element 430 is electrically connected to the driving element 410 and an external power source, providing a driving signal to the first driving assembly 400.

Figure 3:
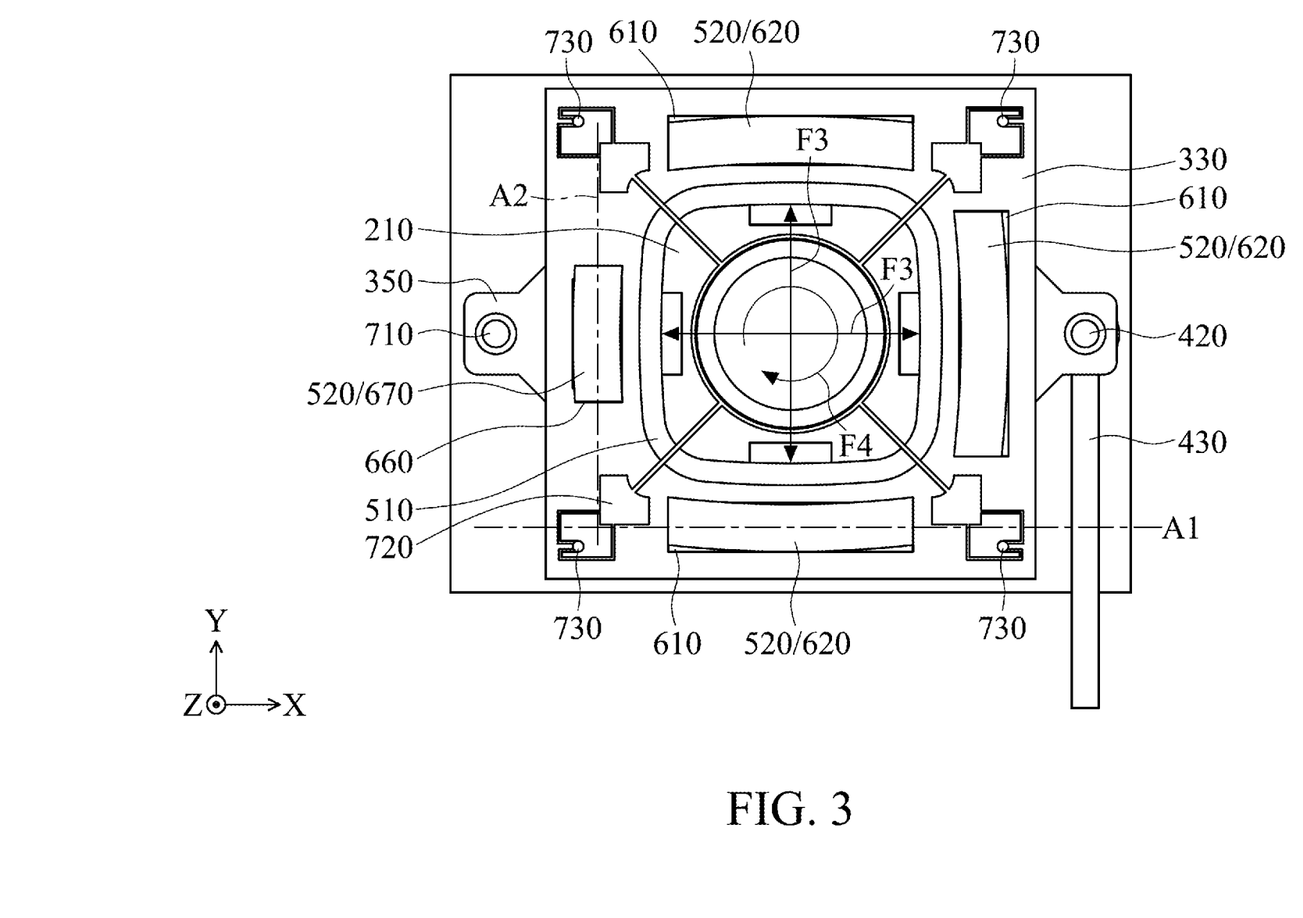
FIG. 3 is a top view of the optical element driving mechanism, according to some embodiments of the present disclosure, wherein the case and the first movable portion are omitted.
Figure 4:
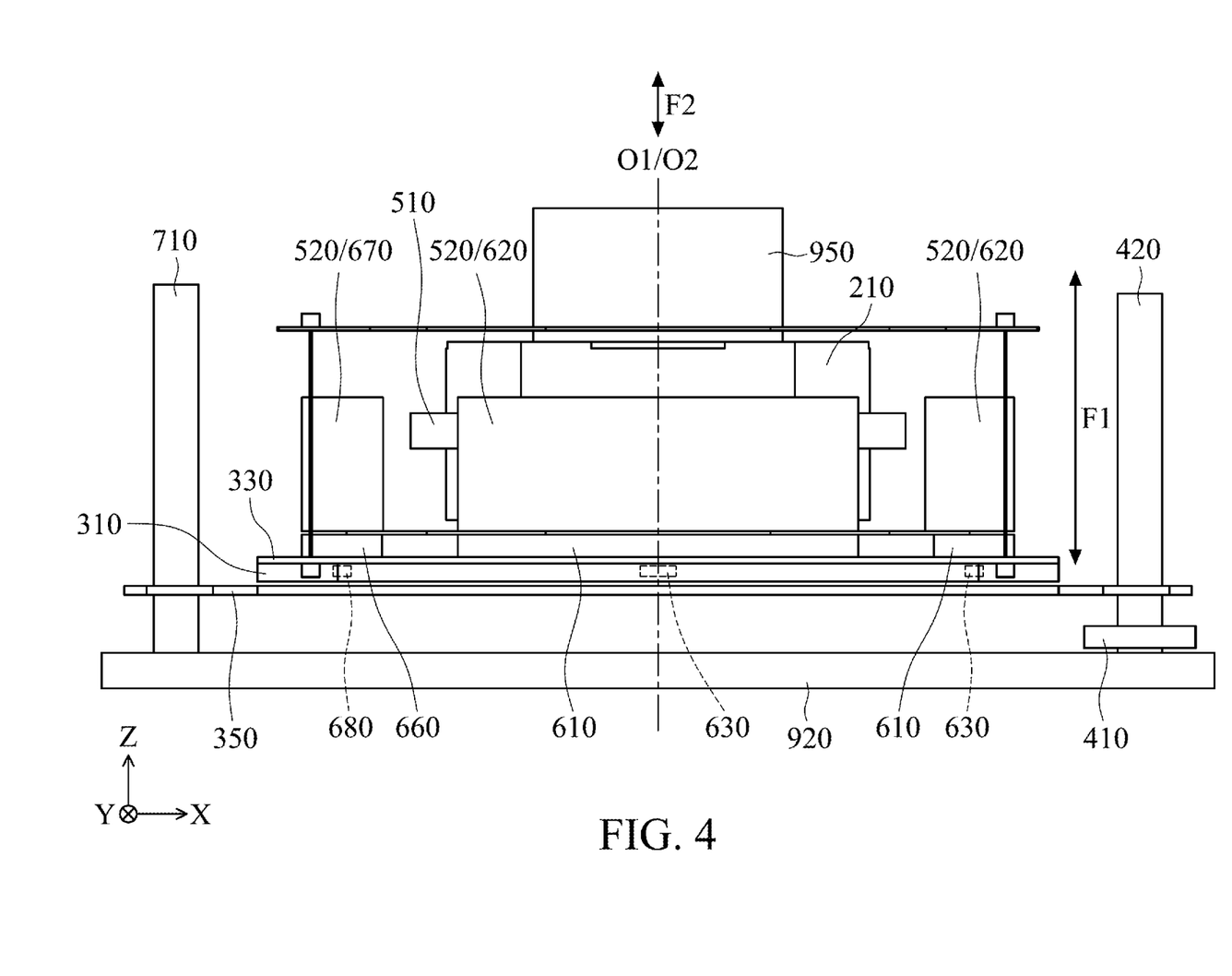
FIG. 4 is a front view of the optical element driving mechanism, according to some embodiments of the present disclosure, wherein the case and the first movable portion are omitted.

Next, referring to FIG. 3 and FIG. 4, FIG. 3 and FIG. 4 are respectively a top view and a front view of the optical element driving mechanism 10, according to some embodiments of the present disclosure, wherein the case 910 and the first movable portion 100 are omitted. In some embodiments, the second movable portion 200 includes a first holder 210. The first holder 210 may be connected to the first optical element (not shown). For example, the first optical element may be disposed inside the first holder 210. The third movable portion 300 includes a second holder 310, a circuit assembly 330 and a bottom board 350. The second holder 310 may be connected to the second optical element (not shown). For example, the second optical element may be disposed inside the second holder 310. The circuit assembly 330 is electrically connected to the third driving assembly 600, providing driving force to the third movable portion 300. The bottom board 350 is fixedly connected to the second holder 310. There are holes on the bottom board 350 for the first driving assembly 400 and the first supporting assembly 710 to go through.

As shown in FIG. 3, the second driving assembly 500 includes a first coil 510 and at least one first magnetic elements 520. In the embodiment of FIG. 3, the first coil 510 has a ring structure surrounding the second movable portion 200, which is helpful for simplifying the circuit routes. In some other embodiments, the first coil 510 may also be multiple coils that are disposed on each side of the second movable portion 200. In the embodiment of FIG. 3, the second driving assembly 500 includes four of the first magnetic elements 520, disposed on four sides of the second movable portion 200, respectively. The first magnetic elements 520 correspond to the first coil 510, generating the second driving force F2 (FIG. 4). The direction of the second driving force F2 is parallel to the first optical axis O1. The second driving force F2 drives the second movable portion 200 to move along the first optical axis O1 relative to the fixed portion 900.

As shown in FIG. 3 and FIG. 4, the third driving assembly 600 includes three of the second coils 610 and three of the second magnetic elements 620. Each of the second magnetic elements 620 corresponds to one of the second coils 610, generating the third driving force F3. Due to the positions of the second coils 610 and the second magnetic elements 620, the third driving force F3 may be generated in X direction and in Y direction, so that the third driving assembly 600 may drive the third movable portion 300 to move in X direction and in Y direction, that is, in directions that are perpendicular to the second optical axis O2. When viewed along the second optical axis O2, any one of the third driving forces F3 extends through the center of the second optical element, as shown in FIG. 3. Additionally, since the second coils 610 and the second magnetic elements 620 are all disposed above the second optical element (in the +Z direction), the third driving forces F3 do not extend through the center of the second optical element when viewed in a direction that is perpendicular to the second optical axis O2 (as the view angle in FIG. 4). The third driving assembly 600 further includes a third coil 660 and a third magnetic element 670. The third magnetic element 670 corresponds to the third coil 660, generating the fourth driving force F4. As shown in FIG. 3, the direction of the fourth driving force F4 is perpendicular to the second optical axis O2, being a driving force that rotates around the second optical axis O2. Therefore, the third driving assembly 600 may also drive the third movable portion 300 to rotate around the second optical axis O2.

It should be noted that, for miniaturization of the mechanism, in some embodiments, the second magnetic elements 620 may be formed integrally with the first magnetic elements 520, and the third magnetic element 670 may also be formed integrally with one of the first magnetic elements 520. In other words, the second driving assembly 500 and the third driving assembly 600 may share the magnetic elements. Additionally, when viewed along the second optical axis O2, the second magnetic elements 620 may have bar-shaped structures, such as rectangular structures. In FIG. 3, the two of the second magnetic elements 620 that are arranged in Y direction extend along the first axis A1, and the second magnetic element 620 and the third magnetic element 670 that are arranged in X direction extend along the second axis A2. The first axis A1 and the second axis A2 are not parallel. In some embodiments, the first axis A1 is perpendicular to the second axis A2. In the embodiment shown in FIG. 3, the third magnetic element 670 has an arc structure when viewed along the second optical axis O2. The arc structure of the third magnetic element 670 is helpful for the stability of the fourth driving force F4 which provides a rotational motion. As shown in FIG. 3, when viewed along the second optical axis O2, the largest size of the second magnetic element 620 along the first axis A1 is different from the largest size of the third magnetic element 670 along the second axis A2. More specifically, the largest size of the second magnetic element 620 along the first axis A1 is larger than the largest size of the third magnetic element 670 along the second axis A2. Correspondingly, the largest size of the second coil 610 along the first axis A1 is different from the largest size of the third coil 660 along the second axis A2. More specifically, the largest size of the second coil 610 along the first axis A1 is larger than the largest size of the third coil 660 along the second axis A2. Additionally, in some embodiments, the second coil 610 and the third coil 660 may be at least partially embedded in the circuit assembly 330.

Figure 5:
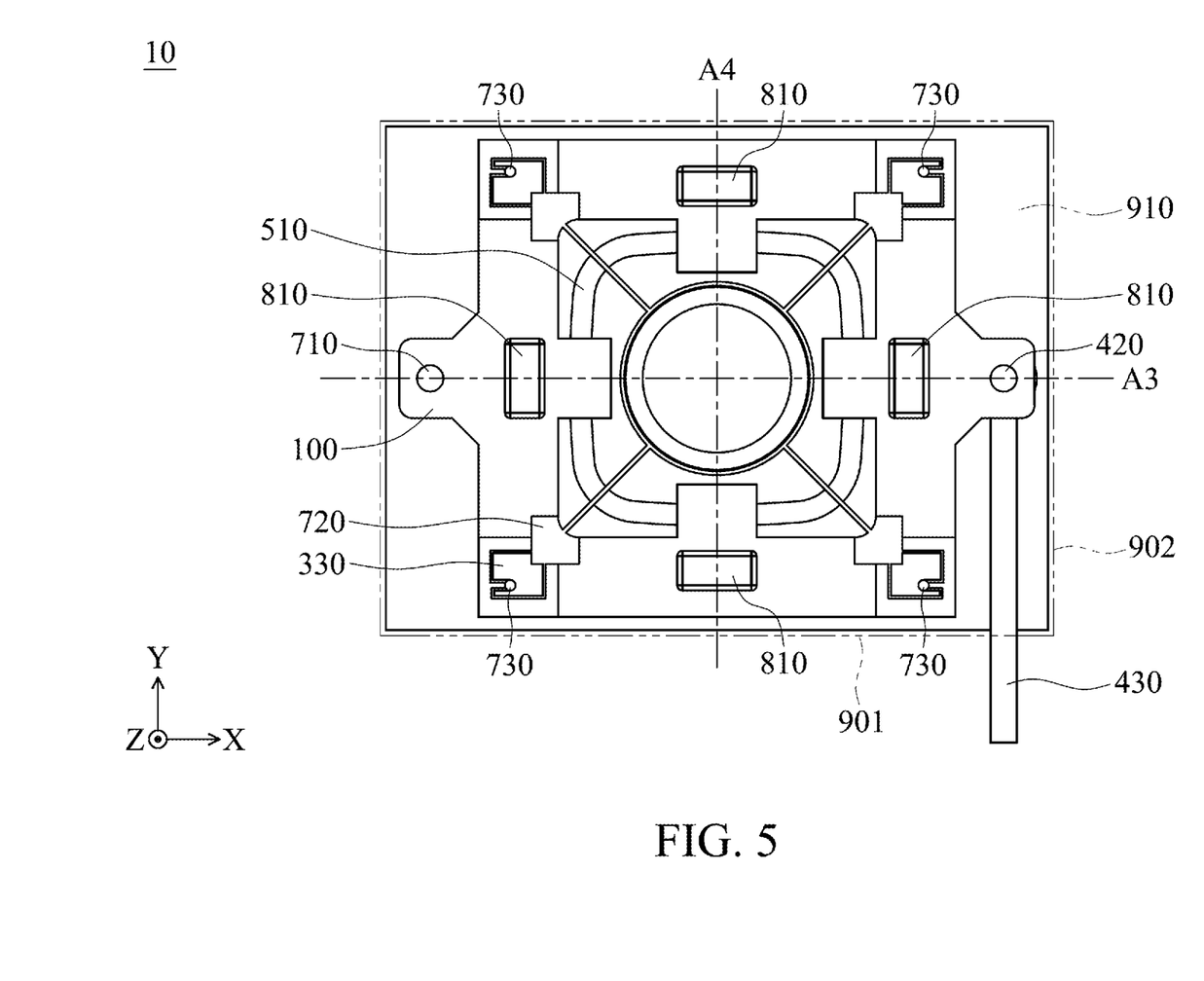
FIG. 5 is a top view of the optical element driving mechanism, according to some embodiments of the present disclosure, wherein the case is omitted.

Next, referring to FIG. 5, FIG. 5 is a top view of the optical element driving mechanism 10, according to some embodiments of the present disclosure, wherein the case 910 is omitted. When viewed along the main axis M, the fixed portion 900 has a polygonal structure, such as a rectangular structure. As mentioned above, the fixed portion 900 includes the first side 901 and the second side 902. The first side 901 extends along a third axis A3, and the second side 902 extends along a fourth axis A4. The largest size of the first side 901 on the third axis A3 is different from the largest size of the second side 902 on the fourth axis A4. More specifically, The largest size of the first side 901 on the third axis A3 is larger than the largest size of the second side 902 on the fourth axis A4. It should be noted that, in the embodiments of the present disclosure, the first axis A1 is parallel to the third axis A3, and the second axis A2 is parallel to the fourth axis A4.

When viewed along the main axis M, the first driving assembly 400 is located at the second side 902 of the fixed portion 900. As a result, the overall size of the mechanism may be reduced in a certain direction (e.g. Y direction). When viewed along the third axis A3, the first driving assembly 400 partially overlaps the second driving assembly 500. When viewed along the fourth axis A4, the first driving assembly 400 does not overlap the second driving assembly 500, and the first driving assembly 400 does not overlap the third driving assembly 600 as well. When viewed along the third axis A3, the first driving assembly 400 partially overlaps the third driving assembly 600. More specifically, when viewed along the third axis A3, the first driving assembly 400 partially overlaps the second magnetic element 620, and the first driving assembly 400 also partially overlaps the third magnetic element 670. Additionally, as shown in FIG. 5, when viewed along the main axis M, a line connecting the first supporting assembly 710 and the first driving assembly 400 passes through the first optical element that is located in the center.

Figure 6:
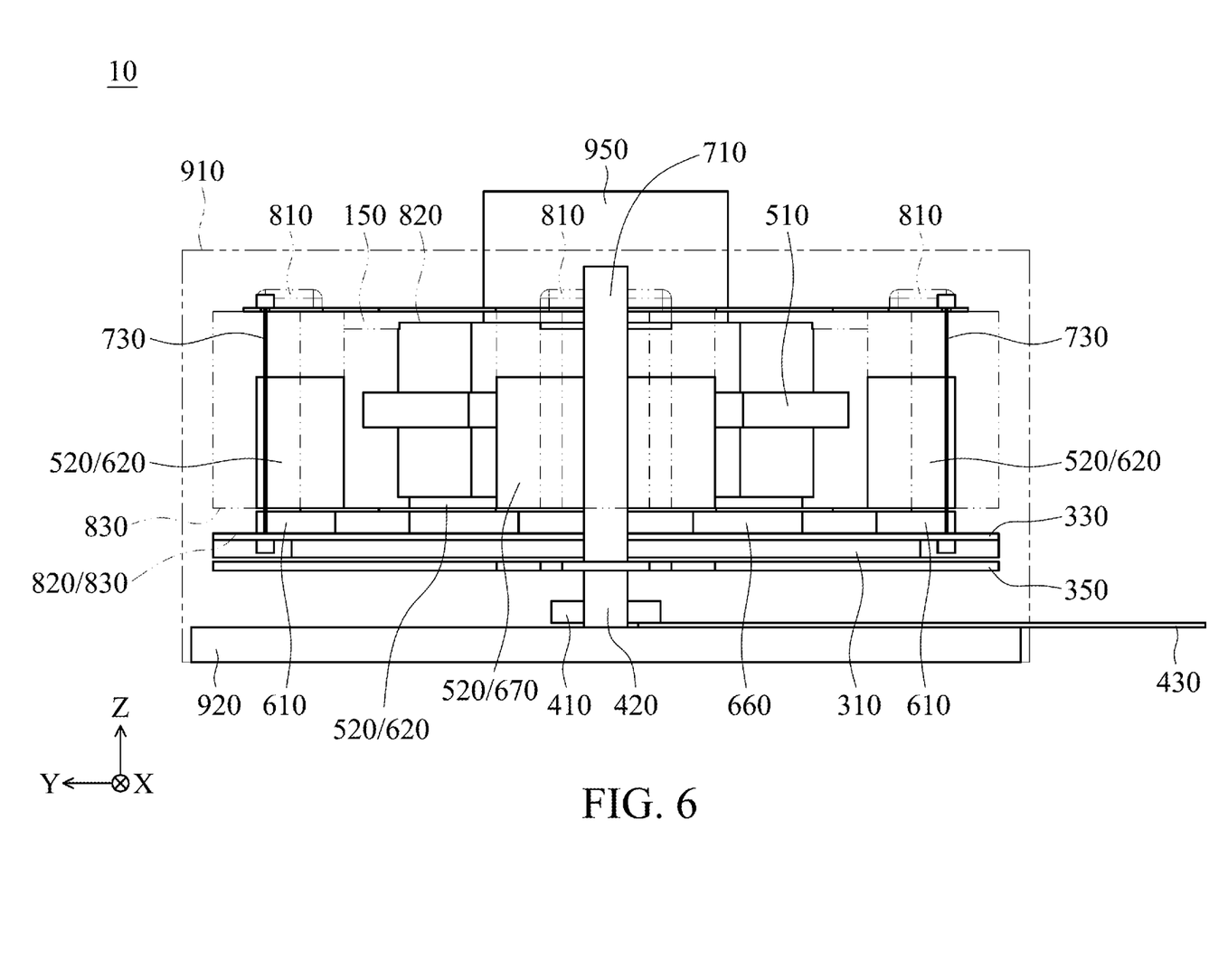
FIG. 6 is a left side view of the optical element driving mechanism, according to some embodiments of the present disclosure.

Next, referring to FIG. 6, FIG. 6 is a left side view of the optical element driving mechanism 10, according to some embodiments of the present disclosure. When viewed along the third axis A3, the first supporting assembly 710 at least partially overlaps the first driving assembly 400; the first supporting assembly 710 partially overlaps the second driving assembly 500; the first supporting assembly 710 partially overlaps the third driving assembly 600; the first supporting assembly 710 partially overlaps the first optical element; and the first supporting assembly 710 partially overlaps the second optical element. Additionally, when viewed along the fourth axis A4, the first supporting assembly 710 does not overlap the first driving assembly 400; the first supporting assembly 710 does not overlap the second driving assembly 500; the first supporting assembly 710 does not overlap the third driving assembly 600; the first supporting assembly 710 does not overlap the first optical element; and the first supporting assembly 710 does not overlap the second optical element.

In some embodiments, the fixed portion 900 may include a case 910, a base 920, and a third optical element 950. The case 910 includes a top wall that has a plate shape and is perpendicular to the main axis M. The base 920 is fixedly connected to the case 910. An accommodating space 925 is formed between the case 910 and the base 920, for accommodating the first movable portion 100 and other components. The third optical element 950 is fixedly disposed on the case 910. In some embodiments, since the third optical element 950 is closer to the light source than the first optical element, the light passes through the third optical element 950 before entering the first optical element. In some embodiments, the third optical element 950 is for optical zooming. In some embodiments, the first driving assembly 400 may drive the first optical element to move relative to the third optical element 950. Additionally, in some embodiments, since the first optical element is closer to the light source than the second optical element, the light passes through the first optical element before entering the second optical element. In other words, before the light arrives at the second optical element (e.g. the optical sensing element), the light passes through the first optical element and the third optical element 950. After the initial optical zooming and/or optical focusing, the light enters the second optical element. However, it should be noted that, in the embodiments according to the present disclosure, the second optical element is movable relative to the first optical element and the third optical element 950. The relative motion may be used for further optical zooming and/or optical focusing effects.

In some embodiments, the optical element driving mechanism 10 further includes a first stopper assembly 810, a second stopper assembly 820, and a third stopper assembly 830. The first stopper assembly 810 is located at the first movable portion 100 and the fixed portion 900. For example, the first stopper assembly 810 may include a plurality of bulges that are located on the top surface of the first movable portion 100. During the motion of the first movable portion 100, when these bulges are in contact with the fixed portion 900, the first movable portion 100 may be defined to move within a first range of movement relative to the fixed portion 900. The second stopper assembly 820 is located at the first movable portion 100 and the third movable portion 300. For example, the first movable portion 100 may include a frame 150 that surrounds its circumference. The second stopper assembly 820 may be located at the surface of the frame 150 that faces the second movable portion 200 and at the surface of the circuit assembly 300 of the third movable portion 300 that faces the second movable portion 200. During the motion of the second movable portion 200, when the second movable portion 200 is in contact with the frame 150 or the circuit assembly 330, the second movable portion 200 may be defined to move within a second range of movement relative to the first movable portion 100. The third stopper assembly 830 is located at the first movable portion 100 and the third movable portion 300. For example, the third stopper assembly 830 may be located at the surface of the first movable portion 100 that faces the third movable portion 300 and at the surface of the circuit assembly 300 of the third movable portion 300 that faces the first movable portion 100. During the motion of the third movable portion 300, when the circuit assembly 330 is in contact with the first movable portion 100, the third movable portion 300 may be defined to move within a third range of movement relative to the first movable portion 100 and/or the second movable portion 200.

In some embodiments, the size of the first range of movement along the main axis M is different from the size of the second range of movement along the main axis M. More specifically, the size of the first range of movement along the main axis M is wider than the size of the second range of movement along the main axis M. These embodiments are adapted to the fact that the stroke distance for optical zooming is usually larger than the stroke distance for optical focusing. In some other embodiments, the sizes of the first range of movement and the second range of movement may be determined based on different requirements.

Additionally, in some embodiments, the optical element driving mechanism 10 may further include a first sensing assembly 550, a second sensing assembly 630, and a third sensing assembly 680. The first sensing assembly 550 is connected to the second driving assembly 500, for sensing the positions of the second movable portion 200 relative to the fixed portion 900. The second sensing assembly 630 is connected to the third driving assembly 600, for sensing the translational positions of the third movable portion 300 relative to the fixed portion 900. The third sensing assembly 680 is connected to the third driving assembly 600, for sensing the rotational positions of the third movable portion 300 relative to the fixed portion 900. In some embodiments, the second sensing assembly 630 and the third sensing assembly 680 may be embedded in the second holder 310, and electrically connected to the circuit assembly 330, as shown in FIG. 4.

In summary, the optical element driving mechanism 10 of the present disclosure includes a plurality of optical elements: the first optical element (e.g. a lens), the second optical element (e.g. an optical sensing element), and the third optical element (e.g. a lens). By using a plurality of driving assemblies (e.g. the first driving assembly 400, the second driving assembly 500, and the third driving assembly 600), through piezoelectric and electromagnetic driving methods, the first optical element and the second optical element are driven to move. In addition to the motion of the lens itself relative to the fixed portion 900, the optical sensing element is also movable and rotatable in the direction that is perpendicular to the optical axis. This is helpful for more precise zooming and/or focusing, achieving better optical effects.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, comprising:
   a first movable portion connected to a first optical element;
   a fixed portion, wherein the first movable portion is movable relative to the fixed portion;
   a first driving assembly driving the first movable portion to move relative to the fixed portion in a first dimension;
   a first supporting assembly disposed between the first movable portion and the fixed portion, wherein the first movable portion moves relative to the fixed portion via the first supporting assembly;
   a second movable portion comprising a first holder, wherein the first holder is connected to the first optical element;
   a second driving assembly driving the second movable portion to move relative to the fixed portion in a second dimension;
   a third movable portion comprising a second holder, wherein the second holder is connected to a second optical element;
   a third driving assembly driving the third movable portion to move relative to the fixed portion in a third dimension; and
   a main axis;
   wherein the first optical element has a first optical axis, and the second optical element has a second optical axis;
   wherein:
   a movement in the first dimension is a translational movement along the main axis;
   a movement in the second dimension is a translational movement along the first optical axis;
   a movement in the third dimension is a translational movement in a direction that is perpendicular to the second optical axis or a rotational movement around a first rotational axis, wherein the first rotational axis is parallel to the second optical axis.

2. The optical element driving mechanism as claimed in claim 1, wherein the second movable portion is movable relative to the first movable portion, and the third movable portion is movable relative to the second movable portion.

3. The optical element driving mechanism as claimed in claim 1, wherein the first optical element includes a lens, and the second optical element includes an optical sensing element.

4. The optical element driving mechanism as claimed in claim 1, wherein the third dimension is different from the first dimension and the second dimension.

5. The optical element driving mechanism as claimed in claim 1, wherein:
   the first driving assembly comprises:
   a driving element, including piezoelectric material, generating a first driving force; and
   a transmitting element, connected to the driving element, transmitting the first driving force to the first movable portion, and movable relative to the fixed portion and the first movable portion;
   the second driving assembly comprises:
   a first coil; and
   a first magnetic element, corresponding to the first coil, generating a second driving force;
   the third driving assembly comprises:
   a second coil;

a second magnetic element, corresponding to the second coil, generating a third driving force;
a third coil; and
a third magnetic element, corresponding to the third coil, generating a fourth driving force;
wherein:
the direction of the first driving force is parallel to the main axis;
a direction of the second driving force is parallel to the first optical axis;
a direction of the third driving force is perpendicular to the second optical axis;
a direction of the fourth driving force is perpendicular to the second optical axis.

6. The optical element driving mechanism as claimed in claim 5, wherein:
when viewed along the second optical axis, the direction of the third driving force passes through the center of the second optical axis;
when viewed along a direction perpendicular to the second optical axis, the direction of the third driving force does not pass through the center of the second optical axis.

7. The optical element driving mechanism as claimed in claim 5, wherein:
when viewed along the second optical axis, the second magnetic element has a bar-shaped structure extending along a first axis, and the third magnetic element has a bar-shaped structure extending along a second axis, wherein the first axis is not parallel to the second axis.

8. The optical element driving mechanism as claimed in claim 7, wherein the first axis is perpendicular to the second axis, and wherein when viewed along the second optical axis, the third magnetic element has an arc structure.

9. The optical element driving mechanism as claimed in claim 7, wherein when viewed along the second optical axis, the largest size of the second magnetic element along the first axis is different from the largest size of the third magnetic element along the second axis, and the largest size of the second coil along the first axis is different from the largest size of the third coil along the second axis.

10. The optical element driving mechanism as claimed in claim 5, wherein when viewed along the main axis, the fixed portion has a polygonal structure, and the fixed portion comprises:
a first side extending along a third axis; and
a second side extending along a fourth axis;
wherein the largest size of the first side on the third axis is different from the largest size of the second side on the fourth axis.

11. The optical element driving mechanism as claimed in claim 10, wherein:
when viewed along the main axis, the first driving assembly is located on the second side;
when viewed along the third axis, the first driving assembly partially overlaps the second driving assembly;
when viewed along the fourth axis, the first driving assembly does not overlap the second driving assembly;
when viewed along the third axis, the first driving assembly partially overlaps the second magnetic element;
when viewed along the third axis, the first driving assembly partially overlaps the third magnetic element;
when viewed along the fourth axis, the first driving assembly does not overlap the third driving assembly.

12. The optical element driving mechanism as claimed in claim 10,
wherein when viewed along the main axis, a line connecting the first supporting assembly and the first driving assembly passes through the first optical element;
wherein when viewed along the third axis:
the first supporting assembly partially overlaps the first driving assembly;
the first supporting assembly partially overlaps the second driving assembly;
the first supporting assembly partially overlaps the third driving assembly;
the first supporting assembly partially overlaps the first optical element; and
the first supporting assembly partially overlaps the second optical element;
wherein when viewed along the fourth axis:
the first supporting assembly does not overlap the first driving assembly;
the first supporting assembly does not overlap the second driving assembly;
the first supporting assembly does not overlap the third driving assembly;
the first supporting assembly does not overlap the first optical element; and
the first supporting assembly does not overlap the second optical element.

13. An optical element driving mechanism, comprising:
a first movable portion connected to a first optical element;
a fixed portion, wherein the first movable portion is movable relative to the fixed portion;
a first driving assembly driving the first movable portion to move relative to the fixed portion in a first dimension;
a first supporting assembly disposed between the first movable portion and the fixed portion, wherein the first movable portion moves relative to the fixed portion via the first supporting assembly;
a second movable portion comprising a first holder, wherein the first holder is connected to the first optical element;
a second driving assembly driving the second movable portion to move relative to the fixed portion in a second dimension;
a third movable portion comprising a second holder, wherein the second holder is connected to a second optical element;
a third driving assembly driving the third movable portion to move relative to the fixed portion in a third dimension;
a second supporting assembly disposed between the first movable portion and the second movable portion, wherein the second movable portion moves relative to the fixed portion via the second supporting assembly; and
a third supporting assembly disposed between the first movable portion and the third movable portion, wherein the third movable portion moves relative to the fixed portion via the third supporting assembly;
wherein a distance between the second supporting assembly and a first side of the fixed portion is smaller than a distance between the second supporting assembly and a second side of the fixed portion.

14. The optical element driving mechanism as claimed in claim 13, wherein:
the first supporting assembly comprises:

a first supporting element, fixedly disposed at the fixed portion, having a bar-shaped structure, wherein the first movable portion moves relative to the first supporting element;

the second supporting assembly comprises:

a second supporting element having flexibility and a plate structure, wherein the second movable portion is movably connected to the first movable portion via the second supporting element;

the third supporting assembly comprises:

a third supporting element having flexibility and a bar-shaped structure, wherein the third movable portion is movably connected to the first movable portion via the third supporting element.

15. An optical element driving mechanism, comprising:

a first movable portion connected to a first optical element;

a fixed portion, wherein the first movable portion is movable relative to the fixed portion;

a first driving assembly driving the first movable portion to move relative to the fixed portion in a first dimension;

a first supporting assembly disposed between the first movable portion and the fixed portion, wherein the first movable portion moves relative to the fixed portion via the first supporting assembly:

a second movable portion comprising a first holder, wherein the first holder is connected to the first optical element;

a second driving assembly driving the second movable portion to move relative to the fixed portion in a second dimension;

a third movable portion comprising a second holder, wherein the second holder is connected to a second optical element;

a third driving assembly driving the third movable portion to move relative to the fixed portion in a third dimension;

wherein the fixed portion further comprises:

a case, including a top wall with a plate shape;

a base, fixedly connected to the case, forming an accommodating space for the first movable portion; and a third optical element affixed to the top wall, wherein a light passes through the third optical element before entering the second optical element;

wherein before the light enters the second optical element, the light passes through the first optical element;

wherein the first driving assembly drives the first optical element to move relative to the third optical element.

16. The optical element driving mechanism as claimed in claim 1, further comprising:

a first stopper assembly, defining a first range of movement within which the first movable portion is movable relative to the fixed portion;

a second stopper assembly, defining a second range of movement within which the second movable portion is movable relative to the first movable portion; and a third stopper assembly, defining a third range of movement within which the third movable portion is movable relative to the second movable portion;

wherein the first range of movement is wider than the second range of movement.

17. The optical element driving mechanism as claimed in claim 16, wherein:

the first stopper assembly is located at the first movable portion and the fixed portion;

the second stopper assembly is located at the first movable portion and the third movable portion;

the third stopper assembly is located at the first movable portion and the third movable portion.

18. The optical element driving mechanism as claimed in claim 16, wherein:

the first movable portion includes a frame surrounding its circumference;

the third movable portion includes a circuit assembly electrically connected to the third driving assembly;

the second stopper assembly is located at the frame and the circuit assembly.

* * * * *